(12) United States Patent
Yamasaki et al.

(10) Patent No.: US 7,642,789 B2
(45) Date of Patent: Jan. 5, 2010

(54) STORAGE DEVICE, AND WRITING UNIT DIAGNOSING METHOD

(75) Inventors: Nobuyoshi Yamasaki, Kawasaki (JP); Masao Kondo, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 436 days.

(21) Appl. No.: 11/699,628

(22) Filed: Jan. 30, 2007

(65) Prior Publication Data

US 2008/0079438 A1    Apr. 3, 2008

(30) Foreign Application Priority Data

Sep. 29, 2006    (JP) ............... 2006-266378

(51) Int. Cl.
*G01R 31/08* (2006.01)
*G06F 11/00* (2006.01)
*G11B 5/09* (2006.01)

(52) U.S. Cl. ............... 324/523; 714/42; 360/53
(58) Field of Classification Search ............... 324/523
See application file for complete search history.

(56) References Cited

U.S. PATENT DOCUMENTS 6,425,097 B1 * 7/2002 Elachkar et al. ............... 714/43
6,676,778 B1 1/2004 Tuchiya et al.
2002/0186490 A1 * 12/2002 Jiang et al. ............... 360/60
2004/0245984 A1 * 12/2004 Barton et al. ............... 324/210
2005/0195648 A1 * 9/2005 Saruki et al. ............... 365/158
2006/0146431 A1 * 7/2006 Tsujimura et al. ............... 360/31

FOREIGN PATENT DOCUMENTS

| JP | 2002-269707 | 9/2002 |
|---|---|---|
| JP | 2004-241043 | 8/2004 |
| JP | 3598076 | 9/2004 |

* cited by examiner

*Primary Examiner*—Jeff Natalini
(74) *Attorney, Agent, or Firm*—Greer, Burns & Crain, Ltd.

(57) ABSTRACT

The present invention provides a storage device and a writing unit diagnosing method, which can determine a defect in a writing unit at an early stage. There is provided a storage device, which includes writing units that write data to a storage medium, current application units that apply a current to the writing units, electric property measurement units that measure the electric property of the writing units at the time of applying a current by the current application units, and obtain electric property measured values, a storage unit that stores the electric property measured values obtained by the electric property measurement units, and a judgment unit that judges whether or not the writing units are abnormal based on the electric property measured values stored in the storage unit.

19 Claims, 7 Drawing Sheets

FIG. 4

| Time [h] | Temp [°C] | Voltage [mV] | Write Current [mA] | Registance [ohm] |
|---|---|---|---|---|
| 0 | 25.5 | 50.2 | 10.0 | 5.0 |
| 1000 | 25.2 | 60.4 | 10.0 | 6.0 |
| 2000 | 25.4 | 50.1 | 10.0 | 5.0 |
| 3000 | 25.0 | 80.3 | 10.0 | 8.0 |
| 4000 | 25.1 | 50.3 | 10.0 | 5.0 |
| 5000 | 25.2 | 60.1 | 10.0 | 6.0 |
| 6000 | 26.2 | 80.2 | 10.0 | 8.0 |
| 7000 | 25.0 | 50.1 | 10.0 | 5.0 |
| 8000 | 25.1 | 50.1 | 10.0 | 5.0 |
| 9000 | 25.5 | 50.2 | 10.0 | 5.0 |
| 10000 | 25.3 | 40.2 | 10.0 | 4.0 |
| 11000 | 25.3 | 50.3 | 10.0 | 5.0 |
| 12000 | 25.4 | 60.1 | 10.0 | 6.0 |
| 13000 | 25.2 | 50.0 | 10.0 | 5.0 |
| 14000 | 25.0 | 50.2 | 10.0 | 5.0 |

STORAGE DEVICE, AND WRITING UNIT DIAGNOSING METHOD

BACKGROUND OF THE INVENTION

1. Field of the Invention

The present invention relates to a storage device which is adapted to diagnose a writing unit, and writing unit diagnosing method.

2. Description of the Related Art

A magnetic disk device makes a write current, which is reversed according to data, flow through a write head (magnetic head) so as to record data to a medium. In recording data, in case a defect in property or degradation in connected resistor occurs in write parts such as a write drive circuit (preamplifier), a suspension, a write head, and connected portions of respective parts which are parts related to the write operation, suitable magnetization reversal cannot be formed on the medium. These defects in write parts are discovered at the time of the read operation, and not only an error rate but also may lose the data in the worst case.

Next, a method of checking the write operation in the conventional magnetic disk device will be explained.

As a first method, there is employed a method under which a preamplifier compares the voltage of a write head with a threshold to check whether or not the write head is defective (write head is OPEN or SHORT).

As a second method, there is employed a method under which the verifying (read) operation is performed after the write operation in accordance with a command from the user to a magnetic disk device to assure the write operation.

As a conventional technique related to the present invention, there is known a magnetic disk memory device that detects whether or not a write head is OPEN or SHORT. (for example, refer to Patent Document 1: Jpn. Pat. Appln. Laid-Open Publication No. 2002-269707)

However, in the above-described first method, the threshold value is uniform with respect to all the heads in a magnetic disk device. Accordingly, only a case in which a write head becomes defective (write head is OPEN or SHORT) can be notified. Similarly, also in the above-described second method, only a case in which the write operation cannot be performed after the write operation can be notified. Therefore, there have been some cases in which written data cannot be restored.

As described above, since it is determined that a write head is defective after the write head has become defective, there have been some cases in which the system is suspended or the restoration of the system becomes difficult. Furthermore, in recent years, it becomes a significantly important task to suppress the suspension of the system due to breakdowns of components of the system and so on to the utmost extent.

SUMMARY OF THE INVENTION

It is therefore an object of the present invention to overcome the above-mentioned drawbacks by providing a storage device and a writing unit diagnosing method, which can determine a defect in a writing unit at an early stage.

According to the present invention, there is provided a storage device, including: writing units that write data to a storage medium; current application units that apply a current to the writing units; electric property measurement units that measure the electric property of the writing units at the time of applying a current by the current application units, and obtain electric property measured values; a storage unit that stores the electric property measured values obtained by the electric property measurement units; and a judgment unit that judges whether or not the writing units are abnormal based on the electric property measured values stored in the storage unit.

According to the present invention, there is also provided a writing unit diagnosing method, which is employed in a storage device having writing units that write data to a storage medium, the method including: a current application step that applies a current to the writing units; a measurement step that measures the electric property of the writing units at the time of applying a current by the current application step, and obtain electric property measured values; a storage step that stores the electric property measured values obtained by the measurement step; and a judgment step that judges whether or not the writing units are abnormal based on the electric property measured values stored by the storage step.

According to the present invention, it is possible to determine a defect in a writing unit of a storage device at an early stage.

BRIEF DESCRIPTION OF THE DRAWINGS

FIG. 4 shows a table indicative of an example of the write circuit measurement history according to the embodiment;

DETAILED DESCRIPTION OF THE PREFERRED EMBODIMENT

A preferred embodiment according to the present invention will further be described below with reference to the accompanying drawings.

Firstly, the configuration of the magnetic disk device (storage device) according to the embodiment will be explained.

Figure 1:
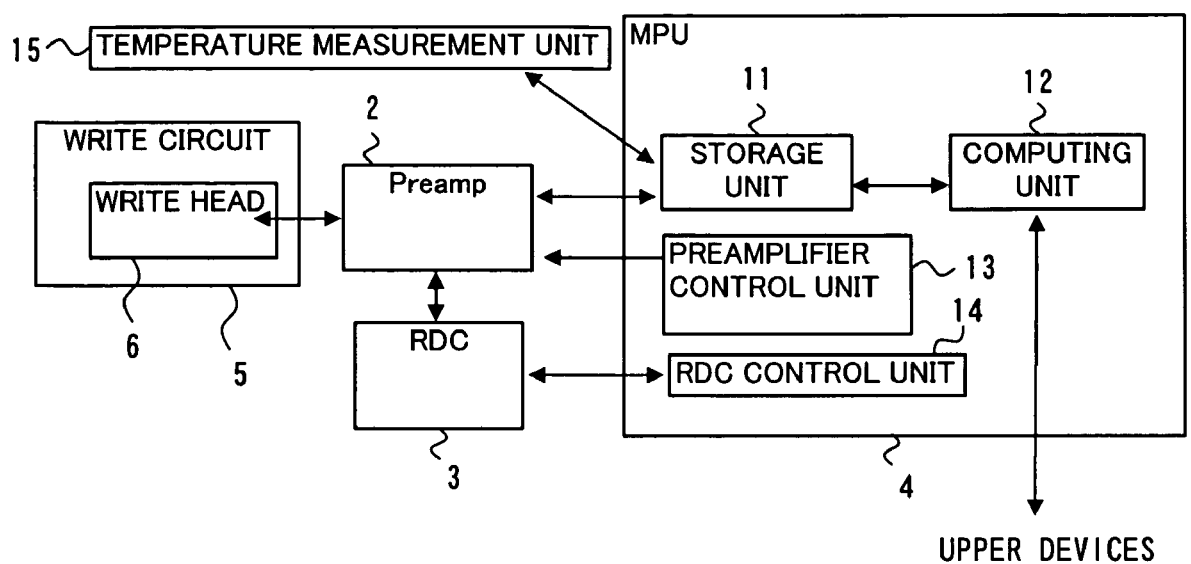
FIG. 1 shows a block diagram indicative of an example of the configuration of a control circuit in a magnetic disk device according to an embodiment of the present invention.

FIG. 1 shows a block diagram indicative of an example of the configuration of a control circuit in a magnetic disk device according to the embodiment. This control circuit includes preamplifiers (Preamps) 2, an RDC (read channel) 3, an MPU (Micro Processing Unit) 4, and write circuits 5. The write circuit 5 is a circuit to which a current is applied from the preamplifier 2, and includes a write head 6. The write circuits 5 and the preamplifiers 2 are plurally arranged. The MPU 4 includes a storage unit 11, a computing unit 12, a preamplifier (Preamp) control unit 13, an RDC control unit 14, and a temperature measurement unit 15. The computing unit 12, the preamplifier control unit 13, and the RDC control unit 14 represent functions of programs to be executed on the MPU 4.

At the time of the write operation, an ECC (Error Correction Code) is appended to write data which is sent to the RDC control unit 14 together with a designation from the host, and the write data having the ECC appended thereto is sent to the RDC 3 to be modulated, and is then sent to the preamplifier 2 as a write signal. Then, the preamplifier 2 applies a current to the write circuit 5 in accordance with the write signal, and the write head 6 writes data to a medium. At the time of the read operation, a signal read out from the medium by a read head (not shown) arranged near the write head 6 in accordance with the designation from the host is sent to the preamplifier 2 from a read circuit (not shown). The signal is then amplified by the preamplifier 2, and sent to the RDC 3 to be demodulated, and is sent to the RDC control unit 14 to be further sent to the host as read data.

The preamplifier 2 is provided with a function of measuring the voltage between terminals of the write circuit 5 including the write head 6, and sends thus measured voltage value to the MPU 4. The MPU 4 performs the write part defect detection processing of detecting defects in write parts based on information from the preamplifier 2 and the like.

Next, the write part defect detection processing by the MPU 4 will be explained.

Figure 2:
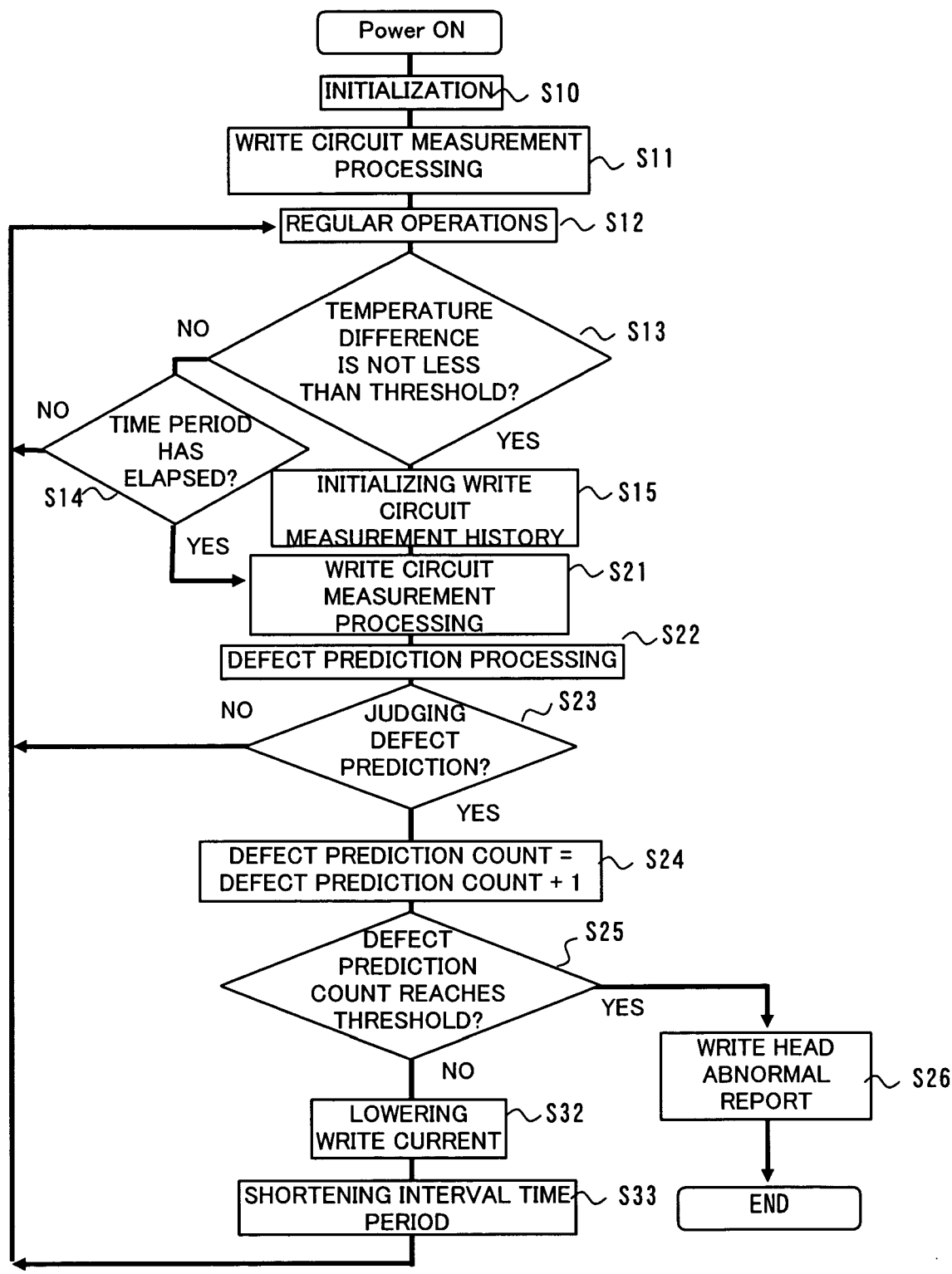
FIG. 2 shows a flowchart indicative of an example of the operation of the write part defect detection processing according to the embodiment.

FIG. 2 shows a flowchart indicative of an example of the operation of the write part defect detection processing according to the embodiment. This flow is started when the power is turned on. Firstly, the computing unit 12 performs the initialization, such as, setting a defect prediction count to "0" (S10), and then performs the write circuit measurement processing of measuring the resistance value of the write circuit 5 and the environmental temperature (S11). The computing unit 12 stores the measurement result by the write circuit measurement processing in the storage unit 11 as a write circuit measurement history. Next, the MPU 4 performs regular operations such as the regular write operation and read operation (S12).

Next, the computing unit 12 judges whether or not the temperature difference between the environmental temperature measured in the preceding write circuit measurement processing and the current environmental temperature is not less than a predetermined temperature difference threshold (for example, 30 degrees). In case the temperature difference is not less than the temperature difference threshold value (S13, YES), the computing unit 12 initializes the write circuit measurement history (S15), and moves to the next processing. In this processing, since the resistance value of the write circuit 5 fluctuates largely when the environmental temperature fluctuates largely, the write circuit measurement history is initialized and a write circuit measurement history in a new environmental temperature is stored so as to prevent falsely detecting a defect. On the other hand, in case the temperature difference is smaller than the temperature difference threshold (S13, NO), the computing unit 12 judges whether or not a predetermined interval time period has elapsed, returning to the processing S12 in case the predetermined interval time period has not elapsed (S14, NO), while going to the next processing in case the predetermined interval time period has elapsed (S14, YES).

Next, the computing unit 12 performs the write circuit measurement processing, which is similar to the processing S11, (S21), and performs the defect prediction processing of predicting defects in write parts based on the write circuit measurement history stored in the storage unit 11 (S24). Next, the computing unit 12 judges whether or not the prediction result by the defect prediction processing is defective, returning to the processing S12 in case it is determined that the prediction result is not defective (S25, NO), while going to the next processing in case it is determined that the prediction result is defective (S25, YES).

Next, the computing unit 12 increments the defect prediction count by "1" (S24), and judges whether or not the defect prediction count reaches a predetermined count threshold (for example, "3"). In case the defect prediction count gets to the count threshold (S25, YES), the computing unit 12 makes a write head abnormal report to the host (S26), ending the flow. On the other hand, in case the defect prediction count does not reaches the count threshold (S25, NO), the computing unit 12 designates the preamplifier control unit 13 to lower the write current (for example, −5 mA) (S32), and shortens the interval time period (for example, in case the initial value is 1000 hours, the interval time period is shortened to 500 hours) (S33), going to the processing S12.

In this processing, since the write current is lowered in case the prediction result by the defect prediction processing is defective, the life of the write head can be prolonged, making it possible to delay the occurrence of defects. Furthermore, since the interval time period is shortened in case the prediction result by the defect prediction processing is defective, the accuracy in defect prediction can be improved, making it possible to detect subsequent defects at an early stage.

In the above description, the magnetic disk device overwatches defects in write parts, and makes a report to the host in case a defect is detected. On the other hand, defects in write parts may be overwatched using commands from the host. Furthermore, the computing unit 12 may immediately make a write head abnormal report to the host in case the prediction result by the defect prediction processing comes to be defective without employing the defect prediction count.

According to the write part defect detection processing, since the defect prediction count is incremented in case the prediction result by the defect prediction processing is defective, and a report concerning a defect is made to the host in case the defect prediction count reaches the count threshold, false detection due to disturbance can be reduced, making it possible to perform detection of high reliability.

Next, the write circuit measurement processing in the above-described processings S11 and S12 will be explained.

Figure 3:
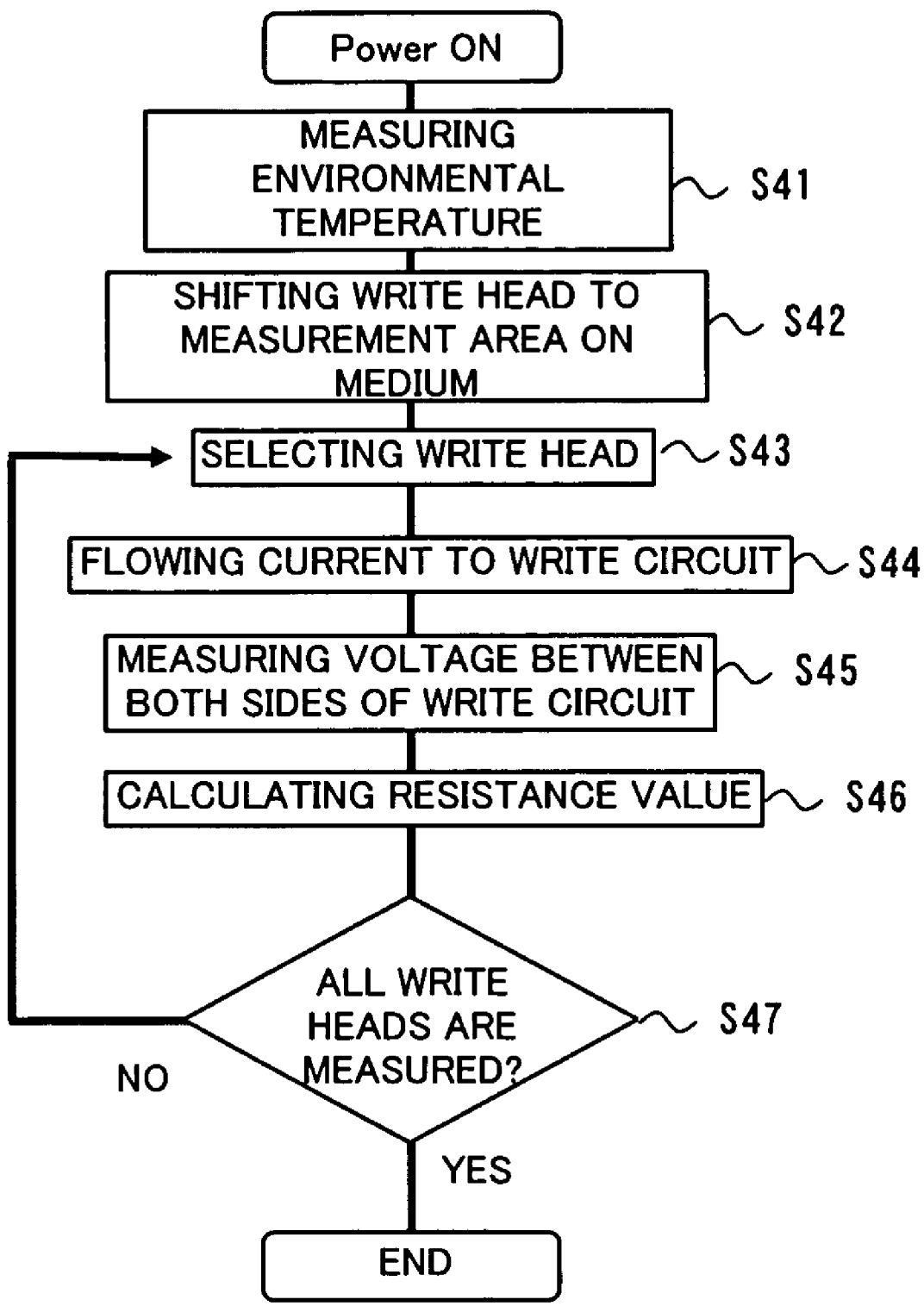
FIG. 3 shows a flowchart indicative of an example of the operation of the write circuit measurement processing according to the embodiment.

FIG. 3 shows a flowchart indicative of an example of the operation of the write circuit measurement processing according to the embodiment. Firstly, the temperature measurement unit 15 measures the environmental temperature, and stores thus measured environmental temperature in the write circuit measurement history in the storage unit 11 (S41). Next, the computing unit 12 shifts the write head 6 to a predetermined measurement area on a medium (S42). The measurement area is an area where there is raised no influence on data even if a current is made to flow through the write head 6, specifically an area where there is not stored important data. Next, the computing unit 12 selects the write head 6 to be measured from the plural write heads 6, and sets thus selected write head 6 to a selected head (S43).

Next, the preamplifier control unit 13 sets the preamplifier 2 to flow a setup current, which is a minute current as compared with a regular write current, to the write circuit 5 corresponding to the selected head (S44), and the preamplifier 2 measures the voltage between both sides of the write circuit 5 corresponding to the selected head, and the computing unit 12 stores thus measured voltage value in the write circuit measurement history in the storage unit 11 (S45). Next, the computing unit 12 calculates the resistance value of the write circuit 5 corresponding to the selected head using the measured voltage value and the current value set up by the preamplifier control unit 13, and stores thus calculated resistance value in the write circuit measurement history in the storage unit 11 (S46).

Next, it is judged whether or not all the write heads 6 are measured, returning to the processing S43 to set the next write head 6 to the selected head in case all the write heads 6 are not measured (S47, NO), while ending the flow in case all the write heads 6 are measured (S47, YES).

In this processing, since a minute current as compared with a regular write current is set to the setup current, the electric power consumption by the write circuit measurement processing can be suppressed. Furthermore, influence on data which has been written on a medium can be suppressed.

Next, the write circuit measurement history will be explained.

FIG. 4 shows a table indicative of an example of the write circuit measurement history according to the embodiment. This write circuit measurement history is stored in the storage unit 11 as a table for the respective write heads 6. The result of one write circuit measurement processing is set to one record, and each record has fields of the measured time period represented by a time period up to a measurement time point during which the magnetic disk device is used (Time) [h (Hour)], environmental temperature (Temp) [° C.], measured voltage value which is the voltage value measured between terminals of the write circuit (Voltage) [V], setup current value which is the current value set up for the preamplifier 2 (Write Current) [mA], measured resistance value which is the resistance value of the write circuit calculated from the measured voltage value and the setup current value (Resistance) [ohm].

In case the measured resistance value depends on the environmental temperature, the computing unit 12 may correct the measured resistance value depending on the environmental temperature to store thus corrected measured resistance value. In this case, it is not necessary to store the environmental temperature in the write circuit measurement history. Furthermore, even if the difference of the environmental temperature in the respective write circuit measurement processings exceeds the temperature difference threshold, the computing unit 12 can utilize all the write circuit measurement histories without initializing the write circuit measurement histories.

Moreover, as is described in the embodiment, in case of measuring the resistance value by making a write current of a constant setup current value flow in the write circuit measurement processing, the setup current value is fixed. In this case, since the measured resistance value can be calculated from the setup current value and the measured voltage value, which are determined in advance, it is not necessary to store the setup current value in the write circuit measurement history.

In the write operation during the regular operation, the resistance value may be measured by regularly writing data in the regular data area on a medium. In this case, by storing the setup current value in the write circuit measurement history in the storage unit 11, the computing unit 12 can calculate the measured resistance value from the fluctuating measured voltage value and the fluctuating setup current value. Accordingly, in this case, the computing unit 12 does not have to shift the write head 6 to a predetermined measurement area in the write circuit measurement processing. Furthermore, by flowing a minute current that does not rewrite data through the write circuit 5, the computing unit 12 may perform the write circuit measurement processing without shifting the write head 6 to a predetermined measurement area.

The write circuit measurement history may be stored in a non-volatile memory. In this case, when interruption is brought about, the interruption can be analyzed by reading out the write circuit measurement history stored in the non-volatile memory. Moreover, the factor of a defect may be specified from the characteristics of change of the measured resistance value in the write circuit measurement history.

Accordingly, the write circuit measurement history can be used in predicting defects in write parts by storing the past measurement result of the write circuit.

Next, the defect prediction processing in the above-described processing S24 will be explained.

The computing unit 12 calculates a relational expression between the measured time period and the measured resistance value from the write circuit measurement history to set thus obtained relational expression to a prediction expression. Furthermore, a normal coefficient range which is the range with respect to normal coefficient is set up in advance so that the computing unit 12 judges the coefficient of the prediction expression. The computing unit 12 sets the prediction result to be fine in case the coefficient of the prediction expression is within the normal coefficient range, while sets the prediction result to be defective in case the coefficient of the prediction expression is not within the normal coefficient range.

Figure 5:
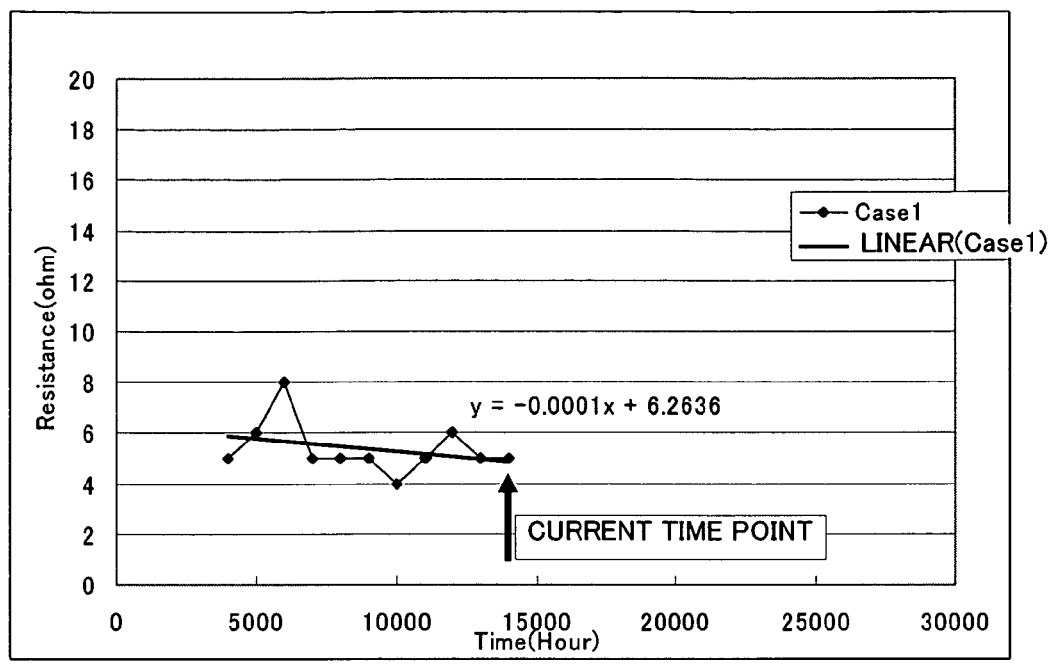
FIG. 5 is a graph indicative of a first example of the operation of the defect prediction processing according to the embodiment.

In this processing, an approximated straight line obtained from the measured time periods and the measured resistance values of a predetermined number is used for the prediction expression, and the inclination of the approximated straight line is used for the coefficient of the prediction expression. Moreover, as the normal coefficient range, the lower limit and upper limit of the inclination of the approximated straight line are set to −0.0002 and 0.0002 in advance, respectively. FIG. 5 is a graph indicative of a first example of the operation of the defect prediction processing according to the embodiment. In this drawing, the abscissa axis represents the measured time period "x" [Hour], while the ordinate axis represents the measured resistance value "y" [ohm]. In this example, using the latest write circuit measurement histories for eleven times from among the write circuit measurement histories shown in FIG. 4, the computing unit 12 calculates an approximated straight line "y=−0.0001x+6.2636" from the latest "x"s and "y"s for eleven times including the current time point. Next, since the inclination of the approximated straight line is within the normal coefficient range, the computing unit 12 sets the prediction result to be fine.

Figure 6:
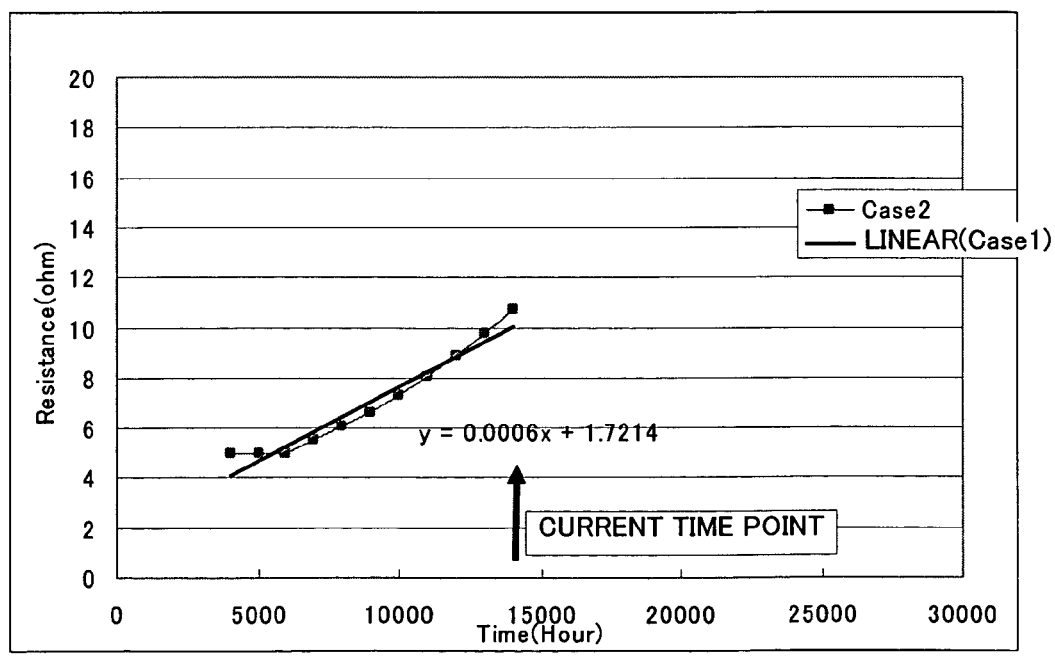
FIG. 6 is a graph indicative of a second example of the operation of the defect prediction processing according to the embodiment.

FIG. 6 is a graph indicative of a second example of the operation of the defect prediction processing according to the embodiment. In this drawing, the abscissa axis represents the measured time period "x" [Hour], while the ordinate axis represents the measured resistance value "y" [ohm]. In this example, using the latest write circuit measurement histories for eleven times, the computing unit 12 calculates an approximated straight line "y=0.0006x+1.7214" from the latest "x"s and "y"s for eleven times including the current time point. Next, since the inclination of the approximated straight line is not within the normal coefficient range, the computing unit 12 sets the prediction result to be defective.

Figure 7:
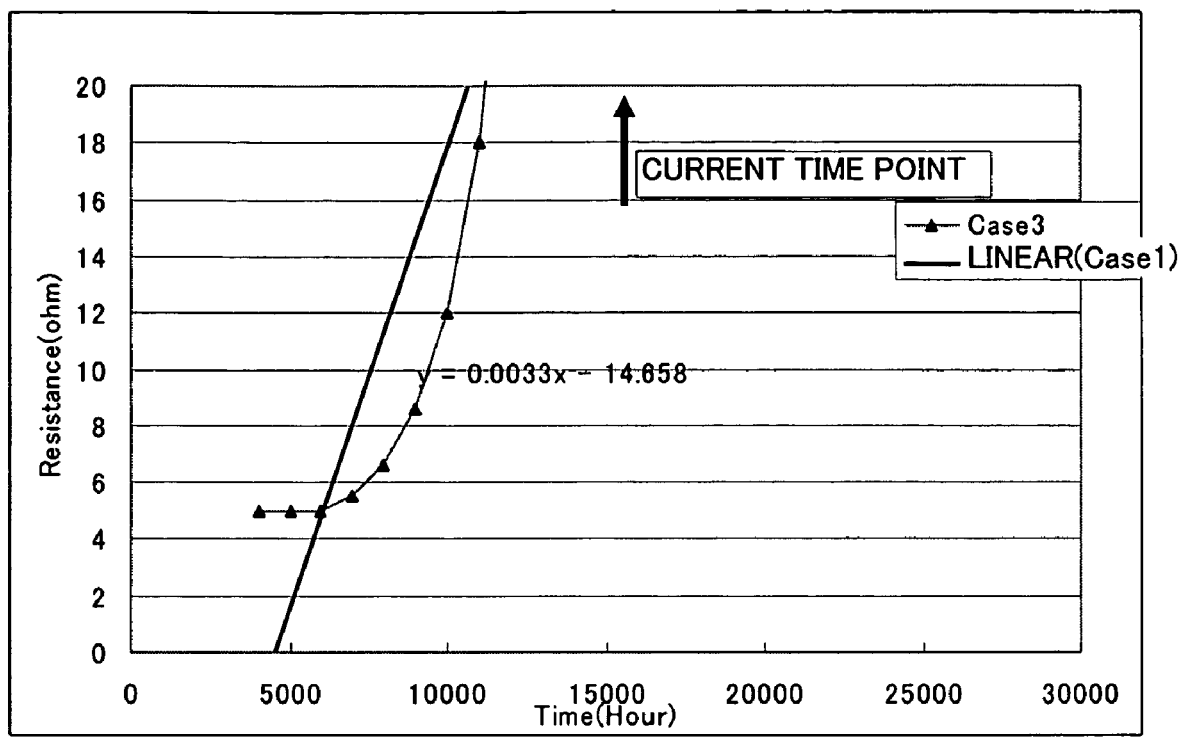
FIG. 7 is a graph indicative of a third example of the operation of the defect prediction processing according to the embodiment.

FIG. 7 is a graph indicative of the third example of the operation of the defect prediction processing according to the embodiment. In this drawing, the abscissa axis represents the measured time period "x" [Hour], while the ordinate axis represents the measured resistance value "y" [ohm]. In this example, using the latest write circuit measurement histories for eleven times, the computing unit 12 calculates an approximated straight line "y=0.0033x−14.658" from the latest "x"s and "y"s for eleven times including the current time point. Next, since the inclination of the approximated straight line is not within the normal coefficient range, the computing unit 12 sets the prediction result to be defective.

The computing unit 12 may perform the defect prediction processing by using the voltage value or the current value instead of the resistance value. In this embodiment, the computing unit 12 uses an approximated straight line for the prediction expression. On the other hand, an approximated curve or other prediction expressions may be used. Furthermore, the computing unit 12 may set the prediction result to be defective in case the rate of change of the measured resistance value with respect to the measured time period is not within a predetermined range.

In this embodiment, the computing unit 12 initializes the write circuit measurement history in case the difference of the environmental temperature in the respective write circuit measurement processings is not less than the temperature difference threshold. On the other hand, the defect prediction processing may be performed using only records in which influence by the environmental temperature is small by restricting records of the write circuit measurement history to be used in the defect prediction processing.

According to the above-descried defect prediction processing, by calculating a prediction expression based on the write circuit measurement history, and predicting the temporal change in the resistance value based on the prediction expression, defects in write parts can be detected at an early stage. Accordingly, being different from a conventional storage device that makes a report after a defect occurs, according to the embodiment, a system trouble can be prevented from occurring or found out at an early stage.

Conventionally, a uniform threshold is set up for all the write heads to judge a defect (OPEN or SHORT), and it has been difficult to determine the abnormality and set up a threshold in case the properties of the respective write heads are different from each other or change. According to the embodiment, by analyzing the change in the resistance value of the write head 6, the abnormality can be easily determined.

In the above-described defect prediction processing, the computing unit 12 sets the prediction result to be defective in case the coefficient of the prediction expression is not within the normal coefficient range. On the other hand, by setting up a normal resistance value range which is the range with respect to normal measured resistance value in advance, the prediction result may be set to be defective in case the measured resistance value is not within the normal resistance value range. Similarly, in the above-described defect prediction processing, by setting up a stipulated value of the measured resistance value in advance, calculating the difference between the measured resistance value and the stipulated value to set thus obtained value to a difference value, and setting up a difference value range which is the range with respect to difference value in advance, the computing unit 12 may set the prediction result to be defective in case the difference value is not within the difference value range. The stipulated value is the measured resistance value in the stable operation state under an environmental temperature within a predetermined range. Furthermore, by calculating a value which is obtained by weighting the difference value depending on the degree of the difference value, the prediction result may be set to be defective in case the value is not within a predetermined range.

Similarly, in the above-described defect prediction processing, by setting up a stipulated value of the measured resistance value in advance, accumulating the difference between the measured resistance value and the stipulated value to set thus obtained value to an accumulated value, and setting up an accumulated value range which is the range with respect to accumulated value in advance, the computing unit 12 may set the prediction result to be defective in case the accumulated value is not within the accumulated value range.

Figure 8:
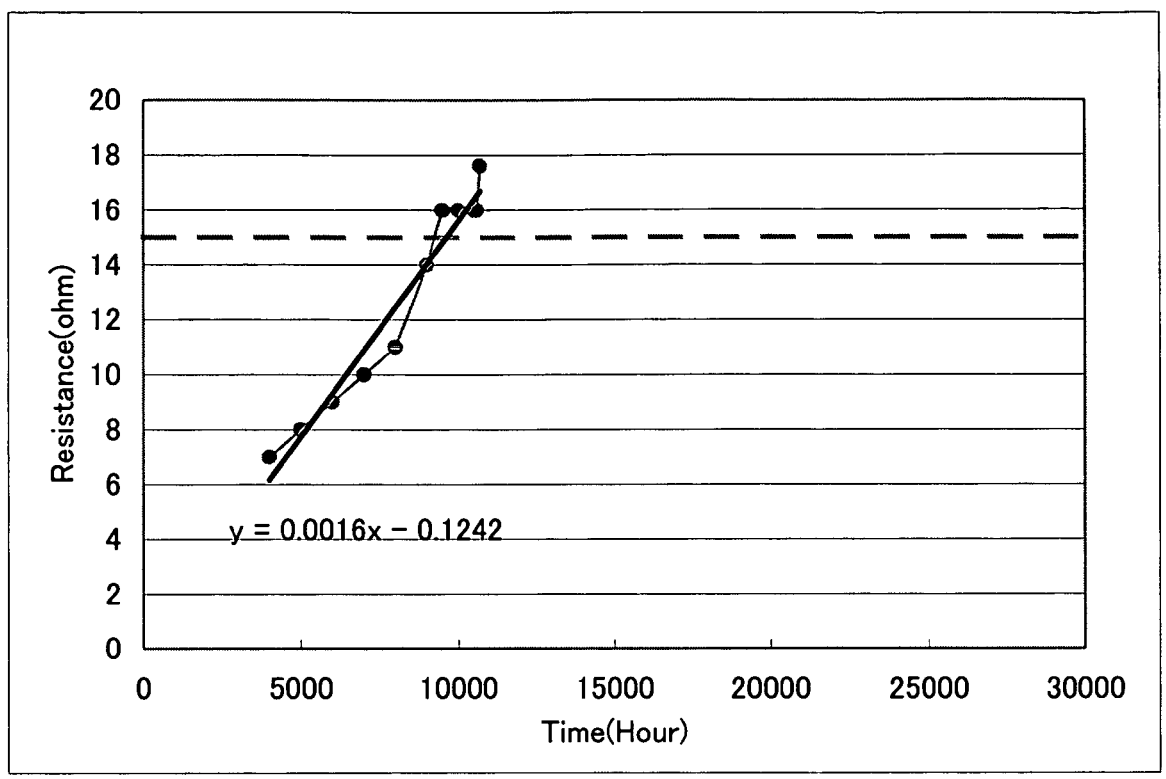
FIG. 8 is a graph indicative of a fourth example of the operation of the defect prediction processing according to the embodiment.

FIG. 8 is a graph indicative of a fourth example of the operation of the defect prediction processing according to the embodiment. In this drawing, the abscissa axis represents the measured time period "x" [Hour], while the ordinate axis represents the measured resistance value "y" [ohm]. In this example, the upper limit of the normal resistance value range is set to 15 Ω, and the interval time period in the early stage is set to 1000 hours. At the time point when the measured resistance value comes to be not within the normal resistance value range, the computing unit 12 reduces the interval time period to 500 hours. In this way, by reducing the interval time period at the time of detecting the abnormality in the current measured resistance value, it becomes possible to cope with subsequent abnormalities at an early stage.

On the other hand, a writing unit corresponds to the write parts in this embodiment. Furthermore, a current application unit corresponds to the preamplifier and the computing unit in this embodiment. Moreover, a judgment unit corresponds to the computing unit in this embodiment. Yet moreover, an electric property measurement unit corresponds to the preamplifier and the computing unit in this embodiment. Yet moreover, a storage unit corresponds to the storage unit in this embodiment. Yet moreover, a temperature measurement unit corresponds to the temperature measurement unit in this embodiment. Yet moreover, a notification unit corresponds to the computing unit in this embodiment. Yet moreover, a predetermined area corresponds to the measurement area in this embodiment. Yet moreover, a predetermined time period corresponds to the interval time period in this embodiment.

On the other hand, a current application step corresponds to the processing S44 in this embodiment. Furthermore, a judgment step corresponds to the processing S22 in this embodiment. Moreover, a measurement step corresponds to the processings S41, S45, S46 in this embodiment. Yet moreover, a storage step corresponds to the processings S41, S45, S46 in this embodiment. Yet moreover, a control step corresponds to the processing S32 in this embodiment. Yet moreover, a notification step corresponds to the processing S26 in this embodiment.

Furthermore, in this embodiment, an explanation is made with respect to a magnetic disk device. However, the present invention can be applied to other storage devices using a writing unit.

What is claimed is:

1. A storage device, comprising:
   a writing unit that writes data to a storage medium;
   a current application unit that applies current to the writing unit;
   an electric property measurement unit that measures an electric property of the writing unit at a time of applying the current by the current application unit, so as to obtain an electric property measured value and the time;
   a storage unit that stores the electric property measured value obtained by the electric property measurement unit and the time; and
   a judgment unit that judges whether or not the writing unit is abnormal based on the electric property measured value stored in the storage unit, wherein
   the judgment unit calculates a coefficient of a relational expression between the electric property measured value and the time based on the electric property measured value and the time stored in the storage unit, and determines that the writing unit is abnormal when the coefficient is not within a predetermined range.

2. The storage device according to claim 1, wherein the electric property is a resistance value of the writing unit.

3. The storage device according to claim 1, further comprising:
a temperature measurement unit that measures an environmental temperature;
wherein the storage unit stores the environmental temperature measured by the temperature measurement unit together with the electric property measured value obtained by the electric property measurement unit; and
the judgment unit judges whether or not the writing unit is abnormal based on the electric property measured value and the environmental temperature stored in the storage unit.

4. The storage device according to claim 3, wherein
the temperature measurement unit measures a first environmental temperature after the temperature measurement unit measures a second environmental temperature, and
when a difference between the first environmental temperature and the second environmental temperature is equal to or larger than a predetermined difference threshold, the judgment unit initializes the electric property measured value and the environmental temperature stored in the storage unit.

5. The storage device according to claim 1, wherein the writing unit has a write head, and
the current application unit applies the current to the writing unit when the write head is located in a predetermined area on the storage medium.

6. The storage device according to claim 1, wherein
the current application unit applies the current to the writing unit at a interval of time.

7. The storage device according to claim 6, wherein,
when the judgment unit determines that the writing unit is abnormal, the current application unit changes the interval.

8. The storage device according to claim 1, wherein
the relational expression is an approximated straight line obtained from the time period and the electric property measured value, and the coefficient is the inclination of the approximated straight line.

9. The storage device according to claim 1, further comprising:
a notification unit that, when the number of times of determining that the writing unit is abnormal by the judgment unit is a predetermined threshold, notifies an upper device of the abnormality.

10. The storage device according to claim 1, wherein,
when the judgment unit determines that the writing unit is abnormal, the current application unit changes a value of a current to be applied to the writing unit.

11. The storage device according to claim 1, wherein,
when the number of times in the state where the electric property measured value is not within a predetermined range is a predetermined number of times, the judgment unit determines that the writing unit is abnormal.

12. The storage device according to claim 1, wherein
the judgment unit accumulates the difference between the electric property measured value and a stipulated value, and determines that the writing unit is abnormal when the accumulated value is not within a predetermined range.

13. A writing unit diagnosing method, which is employed in a storage device including writing unit that write data to a storage medium, the method comprising:
a current application step that applies a current to the writing unit;
a measurement step that measures an electric property of the writing unit at a time of applying a current by the current application step, and obtains an electric property measured value;
a storage step that stores the electric property measured value obtained by the measurement step; and
a judgment step that judges whether or not the writing unit is abnormal based on the electric property measured value stored by the storage step, wherein
the judgment step calculates a coefficient of a relational expression between the electric property measured value and the time based on the electric property measured value and the time stored by the storage step, and determines that the writing unit is abnormal when the coefficient is not within a predetermined range.

14. The writing unit diagnosing method according to claim 13, wherein
the electric property is a resistance value of the writing unit.

15. The writing unit diagnosing method according to claim 13, wherein
the measurement step further measures an environmental temperature,
the storage step stores the electric property measured value and the environmental temperature which are measured by the measurement step, and
the judgment step judges whether or not the writing unit is abnormal based on the electric property measured value and the environmental temperature stored by the storage step.

16. The writing unit diagnosing method according to claim 13, wherein
the writing unit has a write head, and
the current application step applies a current to the writing unit when the write head is located in a predetermined area on the storage medium.

17. The writing unit diagnosing method according to claim 13, wherein
the current application step applies the current to the writing unit at an interval time.

18. The writing unit diagnosing method according to claim 13, further comprising:
a notification step that, when the number of times of determining that the writing unit is abnormal by the judgment step is a predetermined threshold, notifies an upper device of the abnormality.

19. The writing unit diagnosing method according to claim 13, further comprising:
a control step that, when the judgment step determines that the writing unit is abnormal, changes the value of a current to be applied to the writing unit.

* * * * *